(12) United States Patent
Ramsey et al.

(10) Patent No.: US 7,693,740 B2
(45) Date of Patent: Apr. 6, 2010

(54) DYNAMIC SELECTION OF COMPLEMENTARY INBOUND MARKETING OFFERS

(75) Inventors: Mark S. Ramsey, Colleyville, TX (US); David A. Selby, Nr Fareham (GB)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 11/120,593

(22) Filed: May 3, 2005

(65) Prior Publication Data

US 2006/0253468 A1 Nov. 9, 2006

(51) Int. Cl.
*G06F 17/30* (2006.01)
(52) U.S. Cl. ............... 705/10; 705/8; 705/26; 707/1; 707/100
(58) Field of Classification Search ............ None
See application file for complete search history.

(56) References Cited

U.S. PATENT DOCUMENTS

| | | | | |
|---|---|---|---|---|
| 5,930,764 | A * | 7/1999 | Melchione et al. ........... 705/10 |
| 5,966,695 | A * | 10/1999 | Melchione et al. ........... 705/10 |
| 6,236,977 | B1 * | 5/2001 | Verba et al. .................. 705/10 |
| 6,484,163 | B1 | 11/2002 | Lawrence et al. |
| 6,567,786 | B1 | 5/2003 | Bibelnieks et al. |
| 6,847,934 | B1 * | 1/2005 | Lin et al. ..................... 705/10 |
| 6,882,985 | B1 * | 4/2005 | Kay et al. .................... 705/37 |
| 6,925,441 | B1 * | 8/2005 | Jones et al. .................. 705/10 |
| 7,007,088 | B1 * | 2/2006 | Najmi ........................ 709/225 |
| 7,133,834 | B1 * | 11/2006 | Abelow ....................... 705/10 |
| 7,194,448 | B2 * | 3/2007 | Luth et al. ................... 707/1 |
| 7,216,109 | B1 * | 5/2007 | Donner ....................... 705/64 |
| 7,222,078 | B2 * | 5/2007 | Abelow ....................... 705/1 |

(Continued)

FOREIGN PATENT DOCUMENTS

WO    WO 9922328 A1    6/1999

(Continued)

OTHER PUBLICATIONS

Peter R Dickson, Paul W Farris, & Willem J M I Verbeke. (2001). Dynamic strategic thinking. Academy of Marketing Science. Journal, 29(3), 216-237.*

(Continued)

*Primary Examiner*—Bradley B Bayat
*Assistant Examiner*—Gurkanwaljit Singh
(74) *Attorney, Agent, or Firm*—Schmeiser, Olsen & Watts; Anna Linne

(57) ABSTRACT

A database system and method comparing marketing events to marketing offers for offering to a candidate. The database system comprises a first database structure storing a first list of candidates, a second database structure storing a second list identifying marketing offers, a third database structure storing a third list identifying optimized marketing events for a first candidate from the first list, and a database manager software application stored on a computer readable medium. The database manager software application compares each of the optimized marketing events from the third list to each of the marketing offers from said second list in response to an inbound communication from the first candidate. The database manager software application extracts a first group of marketing offers from the second list. Each marketing offer from the first group comprises a same classification as any of the optimized marketing events from the third list.

31 Claims, 3 Drawing Sheets

U.S. PATENT DOCUMENTS

| | | | |
|---|---|---|---|
| 7,280,975 B1* | 10/2007 | Donner | 705/10 |
| 7,364,068 B1* | 4/2008 | Strubbe et al. | 235/376 |
| 7,386,517 B1* | 6/2008 | Donner | 705/75 |
| 7,392,222 B1* | 6/2008 | Hamilton et al. | 705/39 |
| 2001/0037212 A1* | 11/2001 | Motosuna et al. | 705/1 |
| 2002/0007313 A1* | 1/2002 | Mai et al. | 705/14 |
| 2002/0026356 A1* | 2/2002 | Bergh et al. | 705/14 |
| 2002/0040352 A1* | 4/2002 | McCormick | 705/80 |
| 2002/0165771 A1* | 11/2002 | Walker et al. | 705/14 |
| 2003/0046222 A1* | 3/2003 | Bard et al. | 705/38 |
| 2003/0083936 A1* | 5/2003 | Mueller et al. | 705/14 |
| 2003/0084053 A1* | 5/2003 | Govrin et al. | 707/100 |
| 2003/0120584 A1 | 6/2003 | Zarefoss et al. | |
| 2003/0140282 A1 | 7/2003 | Kaler | |
| 2003/0208402 A1* | 11/2003 | Bibelnieks et al. | 705/14 |
| 2003/0229536 A1* | 12/2003 | House et al. | 705/10 |
| 2004/0073496 A1 | 4/2004 | Cohen | |
| 2004/0078273 A1* | 4/2004 | Loeb et al. | 705/26 |
| 2004/0093296 A1* | 5/2004 | Phelan et al. | 705/36 |
| 2004/0103017 A1* | 5/2004 | Reed et al. | 705/10 |
| 2004/0103051 A1* | 5/2004 | Reed et al. | 705/36 |
| 2005/0038893 A1* | 2/2005 | Graham | 709/228 |
| 2005/0043993 A1* | 2/2005 | Stollman et al. | 705/14 |
| 2005/0055275 A1* | 3/2005 | Newman et al. | 705/14 |
| 2005/0071223 A1* | 3/2005 | Jain et al. | 705/14 |
| 2005/0096950 A1* | 5/2005 | Caplan et al. | 705/7 |
| 2005/0137939 A1* | 6/2005 | Calabria et al. | 705/26 |
| 2005/0144065 A1* | 6/2005 | Calabria et al. | 705/14 |
| 2005/0153317 A1* | 7/2005 | DeNise et al. | 435/6 |
| 2005/0154630 A1* | 7/2005 | Lin et al. | 705/10 |
| 2005/0222906 A1* | 10/2005 | Chen | 705/14 |
| 2006/0047563 A1* | 3/2006 | Wardell | 705/10 |
| 2006/0161474 A1* | 7/2006 | Diamond et al. | 705/14 |
| 2006/0247973 A1* | 11/2006 | Mueller et al. | 705/14 |

FOREIGN PATENT DOCUMENTS

| | | |
|---|---|---|
| WO | WO 03093930 A2 | 11/2003 |

OTHER PUBLICATIONS

Drury Jenkins. (Aug. 1999). Customer relationship management and the data warehouse. Call Center Solutions, 18(2), 88-92.*

Marla Royne Stafford. (2005). International Services Advertising (ISA): Defining the Domain and Reviewing the Literature. Journal of Advertising, 34(1), 65-86.*

Woodside, Arch G. "Modeling Linkage-Advertising: Going Beyond Better Media Comparisons" Journal of Advertising Research; Jul./Aug. 1994, vol. 34 Issue 4, p. 22-31, 10p.*

Shaun Doyle. (2005). Real-time technologies in marketing—Interaction management. Journal of Database Marketing & Customer Strategy Management, 12(3), 272-278.*

Honomichl 50: 1998 Business Report on the Marketing Research Industry. (Jun. 1998).*

Steven Stern, & Douglas Barton. (1997). Putting the "custom" in customer with database marketing. Strategy & Leadership, 25(3), 46-50.*

Portuese, Daniela (2006). E-commerce and the Internet: A study on the impact of relationship marketing opportunities for better online consumer intentional relationship. Ph.D. dissertation, Capella University, United States—Minnesota.*

"A database approach to cross selling in the banking industry: Practices, Strategies, and Challenges." Kin-nam Lau; Haily Chow; Connie Liu; Journal of Database Marketing & Customer Strategy Management; Apr. 2004; 11, 3; ABI/Inform Global p. 216.*

"Adoption of Internet Banking Among Sophisticated Consumer Segments in an Advanced Developing Country" Serkan Akinci; Safak Aksoy; Eda Atilgan; The International Journal of Bank Marketing; 2004; 22, 2/3; ABI/Inform Global; p. 212.*

"Interest and reaction time analysis of credit card offers: Managerial implication of High Level Research Procedures" Howard Moskowitz; Dorit Cohen; Bert Krieger; Samuel Rabino; Journal of Financial Services Marketing; Dec. 2001; 6, 2; ABI/Inform Global; p. 172.*

"The customer industry" Gordon A Wyner; Marketing Management; Jan./Feb. 2002; 11, 1; ABI/Inform Global; p. 6.*

* cited by examiner

DYNAMIC SELECTION OF COMPLEMENTARY INBOUND MARKETING OFFERS

BACKGROUND OF THE INVENTION

1. Technical Field

The present invention relates to a system and associated method for ordering marketing offers for offering to a candidate.

2. Related Art

Selling a plurality of services to a customer typically requires a complicated series of steps. Therefore there exists a need for a simple procedure to sell a plurality of services to a customer.

SUMMARY OF THE INVENTION

The present invention provides a database system, comprising:

a first database structure storing a first list of candidates;

a second database structure storing a second list identifying marketing offers;

a third database structure storing a third list identifying optimized marketing events for a first candidate from said first list; and a database manager software application stored on a computer readable medium, wherein said database manager software application comprises a comparison tool and an optimization tool, wherein said comparison tool is for comparing each of said optimized marketing events from said third list to each of said marketing offers from said second list in response to an inbound communication from said first candidate, wherein said optimization tool is for extracting a first group of marketing offers from said second list, and wherein each marketing offer from said first group comprises a same classification as any of said optimized marketing events from said third list.

The present invention provides a selection method, comprising:

providing a database system comprising a database manager software application, a first database structure storing a first list of candidates, a second database structure storing a second list identifying marketing offers, and a third database structure storing a third list identifying optimized marketing events for a first candidate from said first list, wherein each marketing event from said first list comprises a marketing offer and an identified channel means for communicating said marketing offer, wherein said database manager software application is stored on a computer readable medium, and wherein said database manager software application comprises a comparison tool and an optimization tool;

comparing by said comparison tool, each of said optimized marketing events from said third list to each of said marketing offers from said second list in response to an inbound communication from said first candidate; and extracting by said optimization tool, a first group of marketing offers from said second list, wherein each marketing offer from said first group comprises a same classification as any of said optimized marketing events from said third list.

The present invention provides a process for integrating computing infrastructure, comprising integrating computer-readable code into a computing system, wherein the code in combination with the computing system comprises a database system comprising a database manager software application, a first database structure storing a first list of candidates, a second database structure storing a second list identifying marketing offers, and a third database structure storing a third list identifying optimized marketing events for a first candidate from said first list, wherein each marketing event from said first list comprises a marketing offer and an identified channel means for communicating said marketing offer, wherein said database manager software application is stored on a computer readable medium, and wherein said database manager software application comprises a comparison tool and an optimization tool, and wherein the code in combination with the computing system is adapted to implement a method for performing the steps of:

comparing by said comparison tool, each of said optimized marketing events from said third list to each of said marketing offers from said second list in response to an inbound communication from said first candidate; and extracting by said optimization tool, a first group of marketing offers from said second list, wherein each marketing offer from said first group comprises a same classification as any of said optimized marketing events from said third list.

The present invention provides A computer program product, comprising a computer usable medium having a computer readable program code embodied therein, said computer readable program code comprising an algorithm adapted to implement a selection method within a database system, said database system comprising a database manager software application, a first database structure storing a first list of candidates, a second database structure storing a second list identifying marketing offers, and a third database structure storing a third list identifying optimized marketing events for a first candidate from said first list, wherein each marketing event from said first list comprises a marketing offer and an identified channel means for communicating said marketing offer, wherein said database manager software application is stored on a computer readable medium, said method comprising the steps of:

comparing by said comparison tool, each of said optimized marketing events from said third list to each of said marketing offers from said second list in response to an inbound communication from said first candidate; and extracting by said optimization tool, a first group of marketing offers from said second list, wherein each marketing offer from said first group comprises a same classification as any of said optimized marketing events from said third list.

The present invention advantageously provides a system and associated method to implement a simple procedure to sell a plurality of services to a customer.

DETAILED DESCRIPTION OF THE INVENTION

Figure 1:
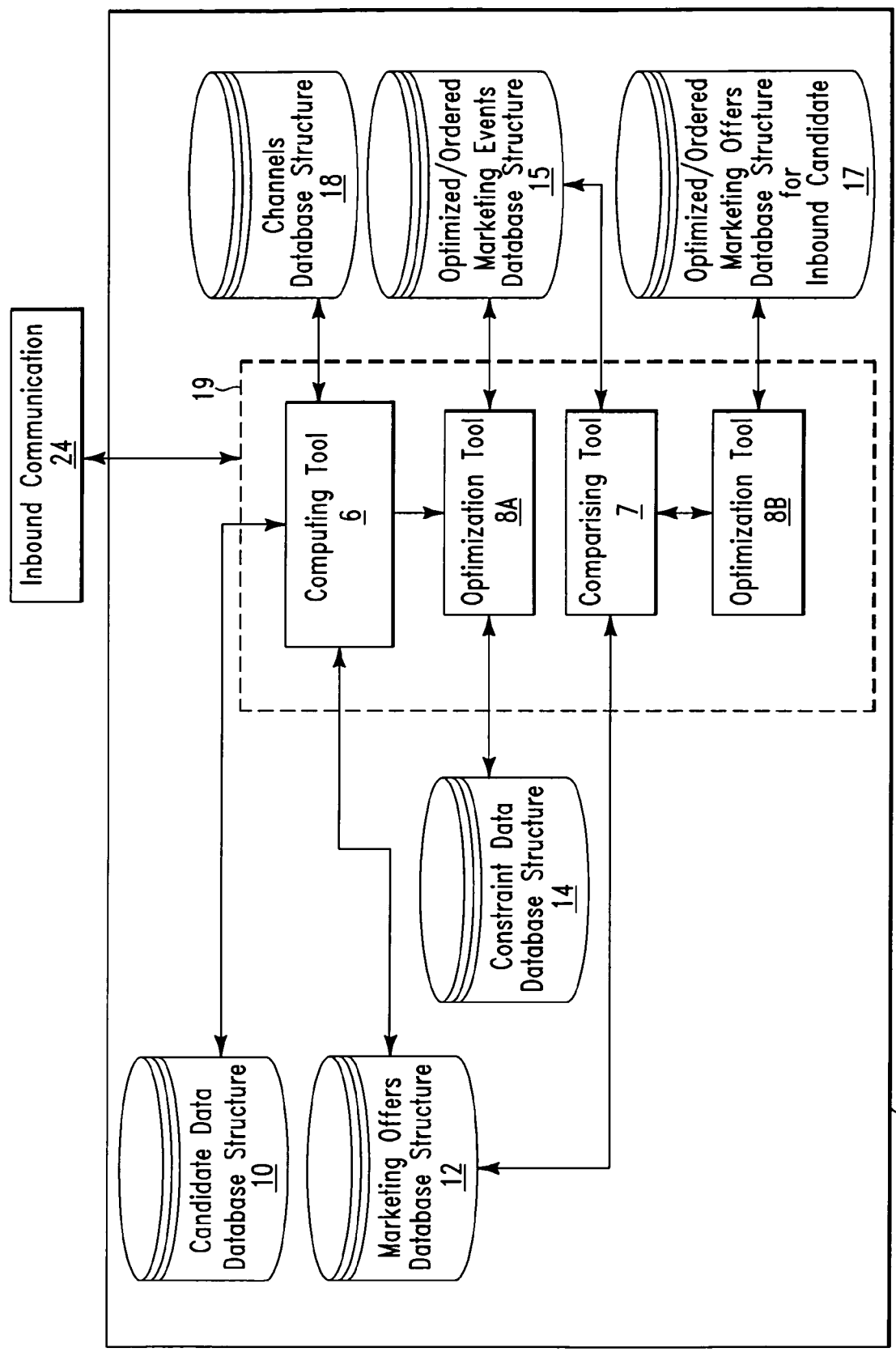
FIG. 1 illustrates a block diagram view of a database system for optimizing and sorting a list identifying a plurality of outbound marketing events for offering to a candidate and comparing the marketing events to a plurality of marketing offers in response to an inbound communication from the candidate, in accordance with embodiments of the present invention.

FIG. 1 illustrates a block diagram view of a database system 2 for optimizing and sorting a list identifying a plurality of outbound marketing events for offering to a candidate and comparing the marketing events to a plurality of marketing offers in response to an inbound communication 24 from the candidate, in accordance with embodiments of the present invention. An inbound communication is defined herein as a communication (e.g., a telephone call) initiated by a candidate to an entity. Any communication means may be used by the candidate to contact the entity (i.e., execute an inbound communication) including, inter alia, e-mail, direct mail, text message, telephone, etc. A marketing event is defined herein as a marketing offer and an identified channel means for communicating the marketing offer to a candidate. For example, a marketing event may comprise a 1.9% APR introductory interest rate for a 12 month period on a credit card, delivered to the candidate through direct mail. A marketing event may either comprise a growth (new marketing offer) marketing event or a retention (existing product like an existing credit card to be retained) marketing event. A marketing offer is defined herein as an offer from an entity (e.g., a business) for a product or service to be extended to a customer or potential customer (i.e., candidate). The product or service may comprise an incentive to entice the customer or potential customer to accept the offer. For example, the marketing offer may comprise a credit card offer that will provide an APR that is lower than the normal for a specified period of time as an incentive, such as, inter alia, 1.9% APR for the first 12 months if the credit card is accepted. A candidate may be an existing customer of the entity and a potential customer for the marketing offer. For example, an individual, a business, etc. A channel is a means to contact the candidate. For example, e-mail, direct mail, text message, telephone, etc. An outbound marketing event comprises a marketing event where an initial contact is made by an entity to offer the marketing event to a candidate. The database system 2 is used by an entity (e.g., a business such as a bank) comprising an existing customer database to sequentially order and optimize outbound marketing events (herein referred to as marketing events) for offering to candidates from the existing customer database. The database system 2 comprises database structures 10, 12, 14, 15, 17, and 18 and a database manager software application 19. The database manager software application 19 is a single database manager software application (i.e., one software application as opposed to multiple software applications). The database manager software application 19 may comprise any type of database management software application including, inter alia, DB2 database management system by IBM, etc. The database manager software application 19 comprises a computing tool 6, a comparison tool 7, and an optimization tool 8A and 8B (i.e., software components). Using a single database manager software application (i.e., database manager software application 19) comprising multiple software components (i.e., computing tool 6, comparison tool 7, and optimization tool 8A, 8B) is advantageous over using a plurality of individual database manager software applications (e.g., a first individual database manager software application comprising a computing tool and a second individual database manager software application comprising an optimization tool) because communications between components of single database manager software application (e.g., computing tool 6, comparison tool 7, and optimization tool 8A and 8B) are faster and more efficient than communications between multiple individual database manager software applications. Communications between components of a single database manager software application are faster and more efficient than communications between multiple individual database manager software applications because data (for manipulation) only has to be moved within a single software application and does not have to be moved from one software application to another software application. Therefore functions performed on the data (e.g., calculations, comparisons, optimizations, etc) are performed faster and more efficiently by a single database manager software application than by multiple database manager software applications. Each of database structures 10, 12, 14, 15, 17, and 18 may be individual database structures within the database system 2. Alternatively, each of database structures 10, 12, 14, 15, 17, and 18 may be tables or sections within a single database structure (e.g., as illustrated in FIG. 1). Database structure 10 comprises customer (i.e., candidate) data including, inter alia, a list of candidates, data models using any customer past history data (e.g., credit card balances, past spending habits, etc.), etc. The customer (i.e., candidate) data comprises information about all of the entity's customers, current or prospective. This data may be compiled from any standard source including, inter alia, an existing marketing database containing data regarding active customers of the entity. The customer data primarily comprises behavioral data (e.g., purchasing history, returned-items history, payment history, etc), promotional (i.e., marketing events) history (e.g., past marketing events offered to a candidate including information regarding which marketing events were accepted by the candidate), and demographic data regarding the candidate. Database structure 10 additionally comprises a predetermined total budget for each candidate regarding an amount of money that the entity offering the marketing events is willing to spend to offer a plurality of marketing events to the candidate. Database structure 12 comprises the marketing offers. The marketing offers in the database structure 12 are assigned classifications to distinguish each marketing offer from each other. The classifications may comprise classifying the marketing offers by type, product type, timing, promotional incentives, etc. Database structure 12 may additionally comprise a predetermined value score associated with each marketing offer. A value score is a numerical score (e.g., in dollars) representing an expected profit gain to be produced by a marketing offer from a candidate accepting and executing the marketing offer. Database structure 12 additionally comprises drop date data for each of the marketing offers. A drop date is an origin date for offering the marketing offer. Database structure 14 comprises constraint data regarding the marketing offer(s) as applied to a candidate. Constraint data comprises constraints that are associated with offering a marketing offer to a candidate. For example, constraint data may include, inter alia, an amount of money regarding execution costs for offering the marketing offer to a candidate (i.e., an amount that the entity has determined that they are willing is to spend to offer the marketing event to the candidate), a maximum number of offerings for a marketing event (e.g., how many times a marketing event is offered to a candidate), timing between offers, etc. Execution costs comprise costs associated with using each of the channels in the channels database structure 18. Execution costs may comprise, inter alia, costs for promotional materials, mailing costs, telemarketing costs, infrastructure costs, etc. Database structure 18 comprises data regarding channels that may be used to communicate the marketing offer to a candidate (e.g., e-mail, direct mail, text message, telephone, etc.). The computing tool 6 applies the data from database structure 18 to the marketing offers from database structure 12 to create a plurality of marketing events stored in database structure 15. The marketing events in database structure 15 each comprise a classification to distinguish each marketing event from each other. The classifications may originate from the classifications assigned to the marketing offers from the database structure 12. Alternatively, the classifications may be assigned by the computing tool 6 or the optimization tool 8A. The classifications may comprise classifying the marketing events by type, product type, timing, promotional incentives, etc. The computing tool 6 uses data supplied from the database structures 10 and 12 to compute response probability scores and ranking scores for each of the marketing events from database structure 15 with respect to each of the candidates. The response probability scores are for determining a probability that a candidate(s) will respond to each of the marketing events. In other words, the response probability scores determine a probability that a candidate will respond to and accept a marketing event within a specified time frame. The response probability scores are calculated using the data models comprising any candidate past history data (e.g., credit card balances, past spending habits, etc.). The ranking score is computed as a function of a value score with respect to a response probability score (e.g., by multiplying a value score for a marketing event with a response probability score for a candidate). Each ranking score is associated with a marketing event for a specific candidate. The ranking scores are used to order the marketing events from highest rank to lowest rank to determine an order in which to offer the plurality of marketing events to the specific candidate. The optimization tool 8A sorts the ranking scores for the marketing events from database structure 15 (e.g., from highest rank to lowest rank) for the candidate and a ranking list is created. The optimization tool 8A uses data from the database structure 14 to apply constraint data (e.g., timing constraints, budget constraints, etc.) to each of the ranking scores on the ranking list for a candidate. The optimization tool 8A applies timing constraints to each of the ranking scores for each of the candidates. The timing constraints eliminate any marketing events that comprise timing conflicts between marketing events. For example, the optimization tool 8A will take the highest ranked marketing event (first marketing event) and compare it to the next highest ranked marketing event (second marketing event). If the two marketing events comprise a same type of marketing event (e.g., both marketing events comprise a credit card offer), then the optimization tool looks for a timing conflict. For example if the first marketing event is to be offered to the candidate every 30 days and the second marketing event is to be offered every 30 days then the second marketing event is eliminated from the ranking list because the two marketing events are same type of marketing event and should not be received by the candidate at the same time. The optimization tool 8A will continue to apply the timing constraints to each of the marketing events on the ranking list. Marketing events comprising timing conflicts are eliminated from the ranking list. The optimization tool 8A then applies monetary (i.e., budget) constraints to the value scores that remain on the ranking list and subtracts the monetary constraints from the predetermined budgeted execution costs for offering the marketing event to the candidate. The predetermined budgeted amount comprises an amount of money for execution costs that the entity has determined that they are willing to spend to offer a plurality of marketing events to the candidate. For example, each time a marketing event is offered to a candidate, the execution costs are deducted from the budgeted amount, and once the budget is exceeded, the optimization tool 8A will eliminate any remaining marketing events from the ranking list. The final ranking list comprises marketing events that have not been eliminated and a specified order for offering the marketing events to the associated candidate. The final ranking list comprising the optimized and sorted marketing events is stored in the database structure 15.

Table 1 illustrates an example of sorted ranking scores with constraint data applied and subtracted from the budget.

TABLE 1

| Ranking score | Constraint data | Budget |
|---|---|---|
| $50 | $10 | $30 |
| $40 | $5 | $20 |
| $30 | $10 | $15 |
| $20 | $5 | $5 |
| $10 | $10 | $0 |

The first row comprises the highest ranked marketing event ($50 rank). The total budget is $30 and the associated constraint data is $10. The constraint data ($10) is subtracted from the budget ($30) for the highest ranked marketing event leaving $20 in the budget for offering more marketing events to the candidate. The second row comprises the next ranked marketing event ($40 rank). The constraint data ($5) is subtracted from the budget ($20) for the next ranked marketing event ($40 rank) leaving $15 in the budget offering more marketing events to the candidate. The optimization tool goes through each ranked marketing event until there is no more money left in the budget (see row 5) thereby eliminating any more offerings for marketing events. The first four rows comprise the marketing events to be offered sequentially to the candidate. The fifth row comprises an eliminated marketing event due to an exhausted budget ($0).

An example of an implementation for dynamically ordering marketing events for a candidate using the database system 2 of FIG. 1 is described as follows. This example comprises six marketing offers and four channels.

Marketing Offers
1. A Mortgage Offer
2. A Credit Card offer
3. A Household insurance offer
4. An Auto insurance offer
5. A Platinum Credit Card
6. A low rate loan offer Channels
1. Mail
2. Email
3. Outbound telephone call
4. Text message The 6 marketing offers are multiplied by the 4 channels to produce 24 marketing events. Each marketing event comprises a drop date and therefore a calendar of events. A first candidate is scored for each of the 24 marketing events with propensity to respond (i.e., a response probability score) to each of the marketing events. All 24 response probability scores are calculated in parallel and each score comprises a range between 0 and 1 with 1 comprising the highest propensity to respond to a marketing event and 0 comprising the lowest propensity to respond to a marketing event. Each of the marketing events comprises an expected profit gain (i.e., value score). For example, if the marketing offer is a mortgage offer, the expected profit margin (i.e., value score) may be calculated based on an annual return of repayments vs. infrastructure costs balanced against the risk of the candidate defaulting on the mortgage vs. prepayment of mortgage before the term is up (although the mortgage may be loaded with a prepayment penalty clause to protect a revenue stream). A ranking score for each of the 24 marketing events is calculated as a function of a value score for each marketing event with respect to a response probability score for the associated marketing event with respect to the first candidate. The aforementioned process is performed by a computing tool (e.g., computing tool 6 in FIG. 1). An optimization tool (e.g., optimization tool 8 in FIG. 1) sorts the 24 marketing events from highest ranking scores to lowest ranking scores. The optimization tool applies constraint data including timing constraints and monetary constraints (i.e., verses budget) to the 24 marketing events. The constraint data is applied to the 24 marketing events starting with the highest ranked marketing event to the lowest ranking marketing event and ultimately an optimized execution list is produced comprising a stream of marketing events that the first candidate will receive. As an alternative, the marketing events may be ordered and optimized by the optimization tool 8A without using value scores, response probability scores, and ranking scores. Additionally, the marketing events may be ordered and optimized by the optimization tool 8A using any combination of the value scores, response probability scores, and ranking scores.

The database structure 15 comprises final ranking lists of optimized and sorted marketing events for offering to candidates to from database 10. Each ranking list is associated with a specific candidate from the database structure 10. Offering a candidate (i.e., candidate from database structure 10) marketing events is more costly to the entity offering the marketing events than offering marketing offers to the candidate in response to an inbound communication 24 from the candidate because marketing events comprise associated costs (e.g., advertising costs, costs associated with channels, etc.) and the marketing offers may be offered to the candidate during the inbound communication initiated by the candidate thereby eliminating some of the associated costs related to the marketing events. In the event that a candidate (i.e., candidate from database structure 10) initiates an inbound communication 24 (i.e., to the entity offering the marketing events), the comparison tool 7 in the database system 2 will compare a final ranking list comprising the optimized and sorted marketing events for the candidate to marketing offers from database structure 12 in response to the inbound communication 24 from the candidate. The comparison tool 7 will compare the final ranking list of the optimized and sorted marketing events for the candidate to marketing offers from the database structure 12 to locate any similarities (i.e., similar classifications) between marketing offers within the optimized and sorted marketing events from final ranking list and the marketing offers from the database structure 12. Similarities (i.e., similar classifications) may comprise, inter alia, a same marketing offer, marketing offers within a same category (e.g., a marketing offer from the optimized and sorted marketing events comprises an offer for a home equity loan and a marketing offer from the database structure 12 comprises a home equity line of credit), marketing offer product type (e.g., a marketing offer from the optimized and sorted marketing events comprises camping equipment and a marketing offer from the database structure 12 comprises camping equipment), promotional incentives, timing, etc. The comparison tool 7 may use the assigned classifications associated with the marketing events and the assigned classifications associated the marketing offers to compare each marketing offer to each marketing event. Upon finding any similarities (e.g., similar offers) between the marketing offers within the optimized and sorted marketing events from final ranking list and the marketing offers from the database structure 12, the comparison tool 7 extracts the similar marketing offers from the database structure 12. The optimization tool 8B, optimizes and sorts the similar marketing offers for the candidate and creates a ranking list of marketing offers for offering to the candidate in response to the inbound communication 24. Optimizing and sorting the similar marketing offers for the candidate may use the same method as described supra for optimizing and sorting the marketing events in database 15. Alternatively, the optimization tool 8B may optimize and sort the similar marketing offers using any method. The ranking list comprising the optimized and sorted similar marketing offers is stored in the database structure 17. The optimized and sorted similar marketing offers from the ranking list may be offered to the candidate using a same communication means as used by the candidate to execute the inbound communication 24. For example, if a candidate calls (i.e., using a telephone) the entity then the marketing offers from the final ranking list may be offered to the candidate using the telephone during the aforementioned call. Alternatively, the optimized and sorted similar marketing offers from the ranking list may be offered to the candidate using a different communication means at a different time. Any communication means may be used to offer the optimized and sorted similar marketing offers from the ranking list to the candidate including, inter alia, e-mail, direct mail, text message, telephone, etc. Additionally, the optimization tool 8B may remove any of the optimized and sorted marketing events comprising any of the similar offers to the marketing offers so that the candidate does not receive duplicate offers. Additionally, any finds which would have been used for the removed marketing events may be re-allocated to another marketing event for the same candidate.

An example of the comparison function performed by the comparison tool 7, is described with reference to table 2 (i.e., similarity of event/offer matrix) as follows:

TABLE 2

|   | Event 1 | Event 2 | Event 3 | Event 4 | Event 5 | Event 6 | Event 7 |
|---|---|---|---|---|---|---|---|
| Offer 1 | 0.2 | 0.3 | 0.1 | 0.2 | 0.1 | 0.0 | 0.5 |
| Offer 2 | 0.1 | 0.3 | 0.2 | 0.4 | 0.4 | 0.2 | 0.2 |
| Offer 3 | 0.1 | 0.2 | 0.5 | 0.4 | 0.3 | 0.1 | 0.3 |
| Offer 4 | 0.1 | 0.5 | 0.0 | 0.1 | 0.1 | 0.4 | 0.4 |
| Offer 5 | 0.1 | 0.2 | 0.3 | 0.5 | 0.4 | 0.3 | 0.2 |
| Offer 6 | 0.4 | 0.3 | 0.5 | 0.4 | 0.3 | 0.3 | 0.4 |
| Offer 7 | 0.0 | 0.2 | 0.4 | 0.3 | 0.1 | 0.5 | 0.2 |

Table 2 comprises marketing events from database structure 15 verses marketing offers from the database structure 12. The comparison function is performed by the comparison tool 7 using similarity scores derived from the assigned classifications associated with the marketing events and the marketing offers. The similarity scores in table 2 are in a range 0 to 1 where 1 comprises most similar and 0 comprises no similarities. Table 2 is used to select, optimize, and sort marketing offers for the candidate in response to the inbound communication 24. The candidate has been scheduled to receive marketing events 1, 3, 5, and 7 (i.e., final ranking list comprising the optimized and sorted marketing events stored in the database structure 15 comprises marketing events 1, 3, 5, and 7 in that order). The comparison tool 7 uses table 2 to look at event 1 and select the inbound offer from database structure 12 with a highest similarity score. Offer 6 with respect to event 1 comprises the highest similarity score (i.e., 0.4) so offer 6 is placed in the database structure 17 for offering to the candidate first. Next the comparison tool 7 uses table 2 to look at event 3 (i.e., next optimized event) to select the inbound offer from database structure 12 with a highest similarity score. Offer 3 with respect to event 3 comprises the highest similarity score (i.e., 0.5) so offer 3 is placed in the database structure 17 for offering to the candidate next. Next the comparison tool 7 uses table 2 to look at event 5 to select the inbound offer from database structure 12 with a highest similarity score. Offer 2 and offer 5 both comprise a same similarity score (i.e., 0.4). The comparison tool may select either offer 2 or offer 5 to place in the database structure 17 for offering to the candidate next. Next the comparison tool 7 uses table 2 to look at event 7 (i.e., next optimized event) to select the inbound offer from database structure 12 with a highest similarity score. Offer 1 with respect to event 7 comprises the highest similarity score (i.e., 0.5) so offer 1 is placed in the database structure 17 for offering to the candidate next. This process maintains a presentation order of the optimized and sorted marketing events as this is in a time based priority order.

Figure 2:
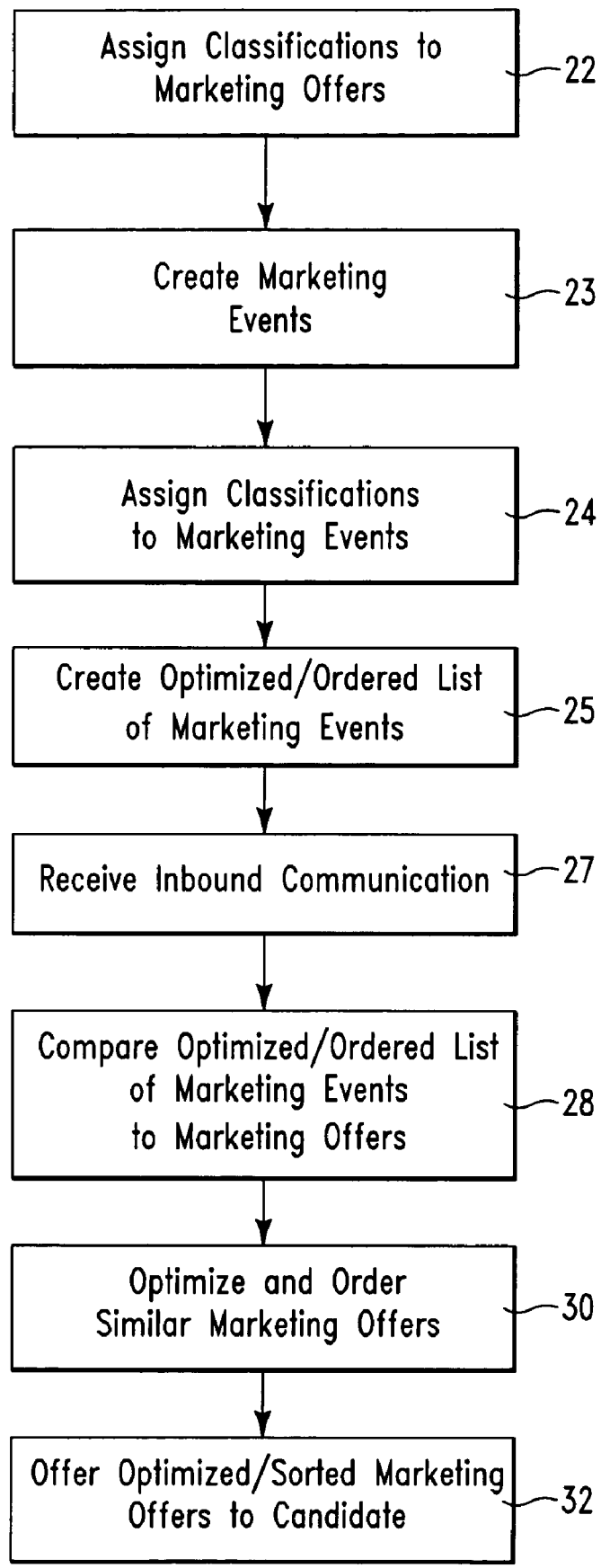
FIG. 2 illustrates a flowchart comprising an algorithm used by database system of FIG. 1 for dynamically ordering a plurality of marketing offers for offering to a candidate in response to an inbound communication from the candidate, in accordance with embodiments of the present invention.

FIG. 2 illustrates a flowchart comprising an algorithm used by database system 2 of FIG. 1 for dynamically ordering a plurality of marketing offers for offering to a candidate in response to an inbound communication from the candidate, in accordance with embodiments of the present invention. In step 22, the marketing offers in the database structure 12 are assigned classifications to distinguish each marketing offer from each other. In step 23, marketing events are created by combining the marketing offers from the database structure 12 with the channels from the database structure 18. In step 24, the marketing events are assigned classifications to distinguish each marketing event from each other. In step 25, the marketing events are optimized and sorted for offering to a candidate. In step 27, an inbound communication 24 from the candidate is received by the database system 2. In step 28, the comparison tool 7 compares the optimized and sorted marketing events for the candidate to marketing offers from the database structure 12 to locate any similarities (i.e., similar classifications) between marketing offers within the optimized and sorted marketing events and the marketing offers from the database structure 12. In step 30, the marketing offers from the database structure 12 comprising similarities to the optimized and sorted marketing events are optimized and sorted for the candidate. In step 32, the optimized and sorted marketing offers are offered to the candidate in response to the inbound communication 24 from the candidate.

Figure 3:
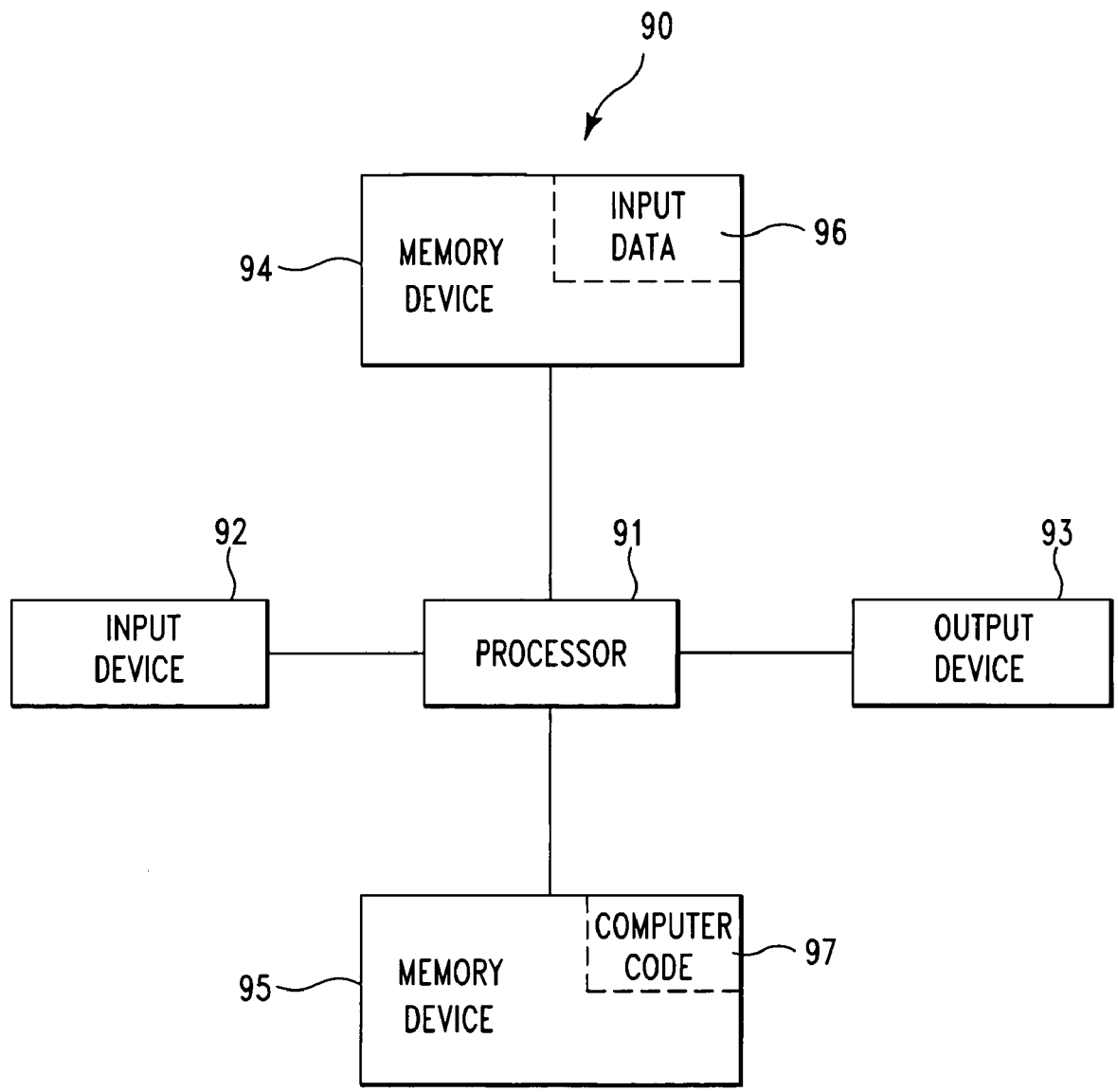
FIG. 3 illustrates a computer system used for implementing the database system for dynamically ordering a plurality of marketing events for offering marketing offers to a candidate, in accordance with embodiments of the present invention.

FIG. 3 illustrates a computer system 90 used for implementing the database system 2 of FIG. 1 optimizing and sorting a list identifying outbound marketing events and comparing the outbound marketing events to a plurality of marketing offers in response to an inbound communication 24 from the candidate, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for dynamically ordering a plurality of marketing events and comparing the marketing events to marketing offers for offering to a candidate in response to an inbound communication from the candidate. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the database system 2 of FIG. 1 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method used for dynamically ordering a plurality of marketing events and comparing the marketing events to marketing offers for offering to a candidate in response to an inbound communication from the candidate.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A database system comprising a computer processor coupled to a computer-readable memory unit, said memory unit comprising a database manager software application, a first database structure storing a first list of candidates, a second database structure storing a second list identifying marketing offers, and a third database structure storing a third list identifying optimized marketing events for a first candidate from said first list, wherein each marketing event from said third list comprises a marketing offer and an identified channel means for communicating said marketing offer, wherein said database manager software application comprises a comparison tool, a computing tool, and an optimization tool, said memory unit comprising instructions that when executed by the computer processor implements a method comprising:

assigning, by said optimization tool, first classifications to said optimized marketing events for said first candidate, wherein said first classifications distinguish each marketing event of said optimized marketing events from each other marketing event of said optimized marketing events;

assigning, by said optimization tool, second classifications to said marketing offers from said second list, wherein said second classifications distinguish each marketing offer of said marketing offers from said second list from each other marketing offer of said marketing offers from said second list;

deriving, by said database manager software application based on said first classifications and said second classifications, similarity scores specifying similarity levels between said optimized marketing events and said marketing offers;

generating a similarity score matrix table comprising a row of identifiers for said optimized marketing events, a column of identifiers for said marketing offers, and a matrix comprising said similarity scores specifying said similarity levels between said identifiers for said optimized marketing events and said identifiers for said marketing offers;

receiving, by said database manager software application, an inbound communication from said first candidate;

comparing by said comparison tool using said similarity score matrix table, each of said optimized marketing events to each of said marketing offers in response to said inbound communication from said first candidate, said processor executing said comparison tool to perform said comparing;

selecting, by said comparison tool based on said matrix comprising said similarity scores, a first group of marketing offers from said second list; and extracting by said computer processor, said first group of marketing offers from said second list, wherein each marketing offer from said first group comprises a same classification as an associated marketing event of said optimized marketing events from said third list, and wherein said computer processor executes said optimization tool to perform said extracting.

2. The database system of claim 1, wherein said optimization tool is for optimizing and sorting, said marketing offers from said first group for said first candidate in response to said inbound communication from said first candidate.

3. The database system of claim 2, wherein said marketing offers from said first group are sorted and optimized essentially simultaneously.

4. The database system of claim 2, wherein said optimization tool is for generating a priority list comprising said sorted marketing offers from said first group, and wherein said priority list prioritizes an order in which to offer each of said marketing offers from said first group to said first candidate upon receiving said inbound communication.

5. The database system of claim 2, wherein said optimization tool is for generating a priority list comprising a second group of marketing offers from said sorted marketing offers from said first group that fall within a specified set of constraints, and wherein said priority list prioritizes an order in which to offer each of said marketing offers from said second group of marketing offers to said first candidate upon receiving said inbound communication.

6. The database system of claim 5, wherein said specified set of constraints comprise timing conflicts related to offering all of said marketing offers from said first group.

7. The database system of claim 5, wherein said specified set of constraints comprise budget constraints related to offering all of said marketing offers from said first group.

8. The database system of claim 1, wherein said first list of candidates comprises existing customers of an entity that is offering said first group of marketing offers.

9. The database system of claim 1, wherein each marketing offer from said first group is selected from the group consisting of a product offer and a service offer.

10. The database system of claim 1, wherein said optimization tool is for removing from said third list any of said optimized marketing events comprising any of said same classifications as said marketing offers from said first group.

11. A selection method, comprising:

providing a database system comprising a computer processor coupled to a computer-readable memory unit, wherein said computer readable memory unit comprises a database manager software application, a first database structure storing a first list of candidates, a second database structure storing a second list identifying marketing offers, and a third database structure storing a third list identifying optimized marketing events for a first candidate from said first list, wherein each marketing event from said third list comprises a marketing offer and an identified channel means for communicating said marketing offer, and wherein said database manager software application comprises a comparison tool, a computing tool, and an optimization tool;

assigning, by said optimization tool, first classifications to said optimized marketing events for said first candidate, wherein said first classifications distinguish each marketing event of said optimized marketing events from each other marketing event of said optimized marketing events;

assigning, by said optimization tool, second classifications to said marketing offers from said second list, wherein said second classifications distinguish each marketing offer of said marketing offers from said second list from each other marketing offer of said marketing offers from said second list;

deriving, by said database manager software application based on said first classifications and said second classifications, similarity scores specifying similarity levels between said optimized marketing events and said marketing offers;

generating a similarity score matrix table comprising a row of identifiers for said optimized marketing events, a column of identifiers for said marketing offers, and a matrix comprising said similarity scores specifying said similarity levels between said identifiers for said optimized marketing events and said identifiers for said marketing offers;

receiving, by said database manager software application, an inbound communication from said first candidate;

comparing by said comparison tool using said similarity score matrix table, each of said optimized marketing events to each of said marketing offers in response to said inbound communication from said first candidate, said processor executing said comparison tool to perform said comparing;

selecting, by said comparison tool based on said similarity scores, a first group of marketing offers from said second list; and extracting by said computer processor, a first group of marketing offers from said second list, wherein each marketing offer from said first group comprises a same classification as an associated marketing event of said optimized marketing events from said third list, and wherein said processor executes said optimization tool to perform said extracting.

12. The method of claim 11, further comprising:
optimizing by said optimization tool, said marketing offers from said first group for said first candidate in response to said inbound communication from said first candidate; and
sorting by said optimization tool, said marketing offers from said first group for said first candidate in response to said inbound communication from said first candidate.

13. The method of claim 12, wherein said marketing offers from said first group are sorted and optimized essentially simultaneously.

14. The method of claim 12, further comprising generating by the optimization tool, a priority list comprising said sorted marketing offers from said first group, and wherein said priority list prioritizes an order in which to offer each of said marketing offers from said first group to said first candidate upon receiving said inbound communication.

15. The method of claim 12, further comprising generating by the optimization tool, a priority list comprising a second group of marketing offers from said sorted marketing offers from said first group that fall within a specified set of constraints, and wherein said priority list prioritizes an order in which to offer each of said marketing offers from said second group of marketing offers to said first candidate upon receiving said inbound communication.

16. The method of claim 15, wherein said specified set of constraints comprise timing conflicts related to offering all of said marketing offers from said first group.

17. The method of claim 15, wherein said specified set of constraints comprise budget constraints related to offering all of said marketing offers from said first group.

18. The method of claim 11, wherein said first list of candidates comprises existing customers of an entity that is offering said first group of marketing offers.

19. The method of claim 11, wherein each marketing offer from said first group is selected from the group consisting of a product offer and a service offer.

20. The method of claim 11, removing from said third list by said optimization tool, any of said optimized marketing events comprising any of said any of said same classifications as said marketing offers from said first group.

21. A computer-executable program product comprising computer executable instructions tangibly embodied on a computer readable medium that when executed by said computer perform the method steps comprising an algorithm adapted to implement a selection method within a database system comprising a computer processor, said database system comprising a database manager software application, a first database structure storing a first list of candidates, a second database structure storing a second list identifying marketing offers, and a third database structure storing a third list identifying optimized marketing events for a first candidate from said first list, wherein each marketing event from said third list comprises a marketing offer and an identified channel means for communicating said marketing offer, wherein said database manager software application comprises a comparison tool, a computing tool, and an optimization tool, and wherein said database manager software application is stored on said computer readable medium, said method comprising the steps of:
assigning, by said optimization tool, first classifications to said optimized marketing events for said first candidate, wherein said first classifications distinguish each marketing event of said optimized marketing events from each other marketing event of said optimized marketing events;
assigning, by said optimization tool, second classifications to said marketing offers from said second list, wherein said second classifications distinguish each marketing offer of said marketing offers from said second list from each other marketing offer of said marketing offers from said second list;
deriving, by said database manager software application based on said first classifications and said second classifications, similarity scores specifying similarity levels between said optimized marketing events and said marketing offers;
generating a similarity score matrix table comprising a row of identifiers for said optimized marketing events, a column of identifiers for said marketing offers, and a matrix comprising said similarity scores specifying said similarity levels between said identifiers for said optimized marketing events and said identifiers for said marketing offers;
receiving, by said database manager software application, an inbound communication from said first candidate;
comparing by said comparison tool using said similarity score matrix table, each of said optimized marketing events to each of said marketing offers in response to said inbound communication from said first candidate, said processor executing said comparison tool to perform said comparing;
selecting, by said comparison tool based on said similarity scores, a first group of marketing offers from said second list; and
extracting by said computer processor, a first group of marketing offers from said second list, wherein each marketing offer from said first group comprises a same classification as an associated marketing event of said optimized marketing events from said third list, wherein said same classification is comprised by said first classifications and said second classifications, and wherein said computer processor executes said optimization tool to perform said extracting.

22. The computer program product of claim 21, wherein said method further comprises:
optimizing by said optimization tool, said marketing offers from said first group for said first candidate in response to said inbound communication from said first candidate; and
sorting by said optimization tool, said marketing offers from said first group for said first candidate in response to said inbound communication from said first candidate.

23. The computer program product of claim 22, wherein said marketing offers from said first group are sorted and optimized essentially simultaneously.

24. The computer program product of claim 22, wherein said method further comprises generating by the optimization tool, a priority list comprising said sorted marketing offers from said first group, and wherein said priority list prioritizes an order in which to offer each of said marketing offers from said first group to said first candidate upon receiving said inbound communication.

25. The computer program product of claim 22, wherein said method further comprises generating by the optimization tool, a priority list comprising a second group of marketing offers from said sorted marketing offers from said first group that fall within a specified set of constraints, and wherein said priority list prioritizes an order in which to offer each of said marketing offers from said second group of marketing offers to said first candidate upon receiving said inbound communication.

26. The computer program product of claim 25, wherein said specified set of constraints comprise timing conflicts related to offering all of said marketing events from said first list.

27. The computer program product of claim 25, wherein said specified set of constraints comprise budget constraints related to offering all of said marketing offers from said first group.

28. The computer program product of claim 21, wherein said method further comprises removing from said third list by said optimization tool, any of said optimized marketing events comprising any of said any of said same classifications as said marketing offers from said first group.

29. The method of claim 11, wherein said marketing events from said third list comprise associated value scores, and wherein said method further comprises:
  calculating, by said computing tool, a response probability score for each of said optimized marketing events, wherein each said probability score is used to determine a probability that said first candidate will accept each of said optimized marketing events within a specified time frame;
  calculating, by said computing tool, a ranking score for each of said optimized marketing events, wherein said calculating each said ranking score comprises multiplying each said response probability score with an associated value score of said associated value scores;
  sorting, by said optimization tool, each said ranking score;
  generating, by said optimization tool in response to said sorting, a ranking list comprising said optimized marketing events; and
  storing, by said computing system, said final ranking list.

30. The method of claim 11, further comprising:
  removing, by said optimization tool from said third list, a first marketing event of said optimized marketing events; and
  reallocating, by said optimization tool, monetary funds associated with said first marketing event to a second market event of said optimized marketing events.

31. The method of claim 29, further comprising:
  calculating, by said computing tool, said value scores associated with said optimized marketing events from said third list, wherein said value scores are associated with an expected profit gain associated with each said marketing offer from said marketing events, and wherein each said value score is calculated based on an annual return of credit repayments vs infrastructure costs balanced against a risk of a candidate defaulting on said credit repayments;
  applying, by said optimization tool, timing constraint data to each said ranking score;
  removing, by said optimization tool in response to results of said applying said timing constraint data, a first marketing event from said ranking list;
  applying, by said optimization tool, monetary constraint data to a set of value scores of said value scores, wherein said set of value sores are associated with first remaining marketing events on said ranking list after performing said removing said first marketing event;
  removing, by said optimization tool in response to results of said applying said monetary constraint data a second marketing event from said ranking list; and
  generating, by said computer processor in response to said removing said firstmarketing event and said removing said second marketing event, a final ranking list comprising second remaining marketing events of said marketing events after said performing said removing said first marketing event and performing said removing said second marketing event.

* * * * *